United States Patent [19]

Marti et al.

[11] Patent Number: 4,611,827
[45] Date of Patent: Sep. 16, 1986

[54] COMPENSATOR FOR THE COMPENSATION OF AXIAL MOVEMENTS OF PIPE CONDUITS

[75] Inventors: Wilhelm Marti, Horw; Leo Burri, Malters, both of Switzerland

[73] Assignee: Boa A. G. Luzern, Luzern, Switzerland

[21] Appl. No.: 624,817

[22] Filed: Jun. 26, 1984

[30] Foreign Application Priority Data

Jul. 27, 1983 [CH] Switzerland ............................ 4119/83

[51] Int. Cl.[4] .............................................. F16L 51/02
[52] U.S. Cl. ......................................... 285/3; 285/226; 285/301; 285/299; 285/187
[58] Field of Search .......................... 285/3, 4, 226, 298, 285/299, 301, 114, 187, 227, 49; 403/51, 52

[56] References Cited

U.S. PATENT DOCUMENTS

| 2,014,355 | 9/1935 | Hussman | 285/299 |
| 2,406,234 | 8/1946 | Marancik et al. | 285/299 |
| 4,508,373 | 4/1985 | Ward | 285/226 |

FOREIGN PATENT DOCUMENTS

| 2703064 | 7/1978 | Fed. Rep. of Germany | 285/114 |
| 2232241 | 12/1974 | France | 285/3 |
| 1032745 | 6/1966 | United Kingdom | 285/226 |
| 2042115 | 9/1980 | United Kingdom | 285/114 |
| 2113336 | 8/1983 | United Kingdom | 285/4 |
| 675263 | 7/1979 | U.S.S.R. | 285/226 |

Primary Examiner—Cornelius J. Husar
Assistant Examiner—Eric K. Nicholson
Attorney, Agent, or Firm—Anthony A. O'Brien

[57] ABSTRACT

A first sleeve is connected to a second sleeve by means of a bellows. Brackets are arranged at the mutual circumferential distance along the circumferences of the sleeves which brackets are welded to the first sleeve at an end section thereof. The opposite end section of the brackets rest slidingly on the second sleeve. A clamping ring extends around the second end sections of the brackets at an inclined surface area thereof. This clamping ring is pushed onto these inclined surfaces and urges the end sections of the brackets against the second sleeve. The limiting of the stroke of the compensator is provided by circumferential rings welded to the second sleeve. The relative rotation blocking means is an elongated profile member which is welded onto the second sleeve and contacts a respective bracket. These brackets replace the hitherto known tube sections installed for a mutual guiding of the two sleeves, can be manufactured quite cheaply because due to this improved design only small demands relative to dimensional tolerances must be made.

10 Claims, 7 Drawing Figures

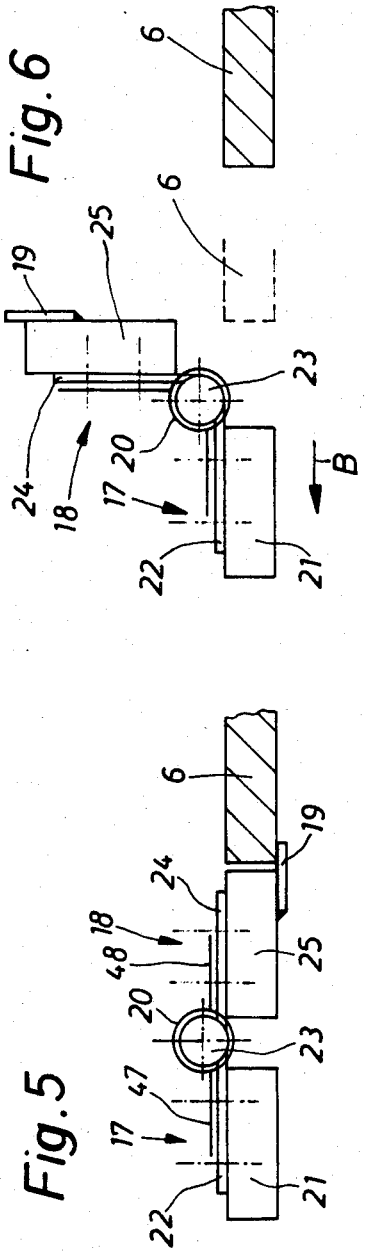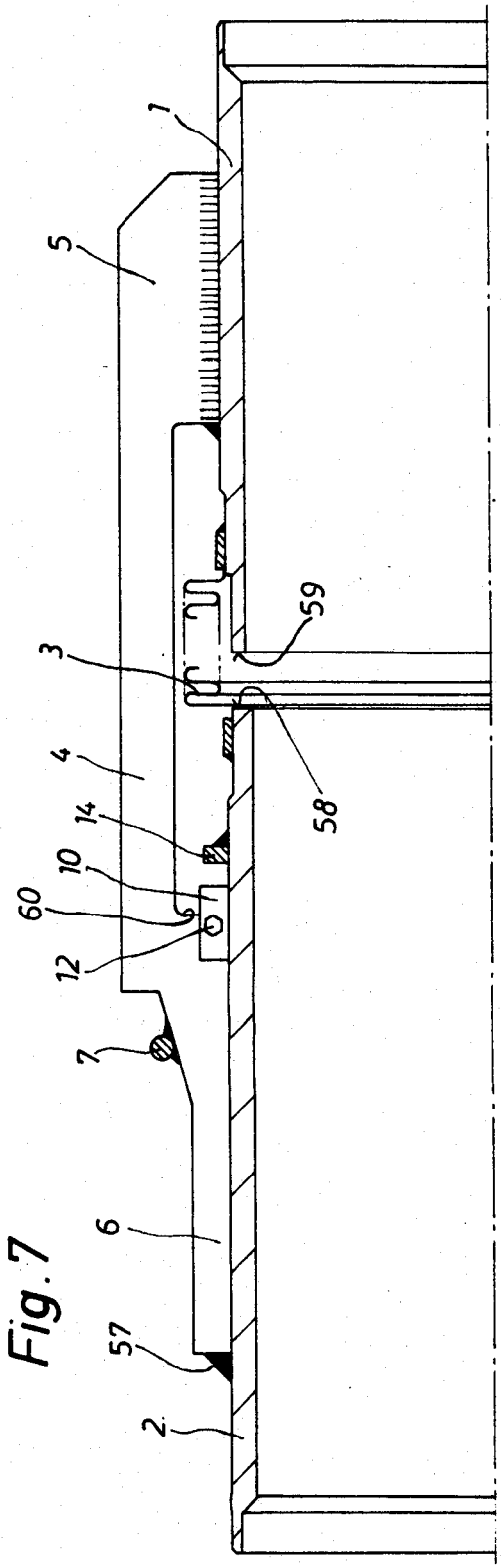

4,611,827

COMPENSATOR FOR THE COMPENSATION OF AXIAL MOVEMENTS OF PIPE CONDUITS

BACKGROUND OF THE INVENTION

1. Field of the Invention

The present invention relates to a compensator for the compensation of axial movements of pipe conduits and including a first sleeve, a second sleeve and a bellows, the first sleeve intended to be mounted to a section of a pipe conduit, the second sleeve intended to be mounted to an opposite section of the pipe conduit and the bellows interconnecting said first and said second sleeves, and including a guiding means for a mutual axial guiding of said first and said second sleeves which guiding means rests slidingly displaceable on at least one of said sleeves.

Pipe conduits are subject to thermically produced changes of their axial length. These changes of the longitudinal extent of the pipe conduits are taken up by various structures such as compensators for compensating axial movements. Such compensators comprise generally two sleeves which at their respective ends are rigidly mounted to the next following pipe conduit section and are interconnected at their respective opposite ends by means of a bellows, a spring bellows. Such bellows is, furthermore, bridged by a guiding means by which the two sleeves are mutually guided.

2. Description of the Prior Art

Such guiding means of the prior art comprise a pipe section having an inner diameter which is larger than the outer diameter of the bellows. One end of such pipe section is welded to an annular flange which in turn is welded to one of the sleeves of the compensator. The other end of the pipe section rests slidingly on a further annular flange which again in turn is welded to the other sleeve and at the surface area being the interface between the other end of the sleeve and the further annular flange there is provided an additional guiding member which is operative to guide the pipe section axially relative to the respective sleeve, however, at the same time to prevent a relative rotating therebetween. These known designs are rather intrinsic because they necessitate a large amount of relatively expensive material, resting interfaces and sliding surfaces which must be exactly machined and worked as well as welding beads of exceedingly large dimensions. When a pipe conduit is completed it often is subjected to a pressure test, e.g. a hydraulic test. During such testing it is necessary to protect the compensator and specifically its bellows section against overly large stresses. Such can be arrived at by utilizing a temporary operating blocking means. According to the prior art only such blocking means have been used which are accessible from the outside, leading to the fact, that in case of a pipe conduit laid in a trench such trench could be filled in not earlier than after having made such pressure test. This is obviously quite time consuming, expensive and cumbersome.

SUMMARY OF THE INVENTION

Hence it is a general object of the present invention to provide an improved construction of a compensator for the compensation of axial movements of pipe conduits which does not comprise large interfaces between slidingly engaging structural members which require exact machining, produces a saving in material and costs and does not necessitate over dimensioned welding beads.

A further object is to provide a compensator for the compensation of axial movements of pipe conduits having a guiding means which comprises a plurality of brackets bridging the bellows of the compensator axially and having a first end section and second end section located opposite of the first end section, at least one of the end sections of each bracket resting slidingly displaceable on a respective sleeve, which end sections of the brackets are located at the mutual distance around the circumference of the respective sleeve and which compensator comprises at least one clamping ring extending around the bracket end sections resting slidingly displaceable on a respective sleeve which clamping ring biasses the respective bracket end sections against the respective sleeve into a sliding engagement and is fixedly mounted to at least several of the brackets.

A further object is to provide a compensator having a self-releasing stroke blocking means operative to remain locked in a first stroke limiting position during an initial hydraulic test and to switch automatically into a second stroke limiting position upon an initial expansion of the pipe conduit including the compensator, which stroke blocking means comprises a spring loaded pivotable locking member biased against the second stroke limiting position and which in the initial hydraulic test position is held locked in the limiting stroke limiting position and after said initial expansion is pivoted by a spring force into the second stroke limiting position.

A further object of the invention is to provide a method of producing by means of the compensator as set forth above a rigid junction between thermically or mechanically pre-stretched pipe sections of a pipe conduit for hot media, which pipe sections initially layed and interconnected in a pressure tight manner, thereafter are thermically stretched and finally interconnected in a force locked manner in their stretched condition and comprising the steps of inserting the compensator between two respective pipe sections and of welding the respective sleeves thereto;

of passing a hot medium through the pipe conduit such to heat and accordingly thermically stretch the pipe sections, whereby the respective pipe sections approach each other axially which axial movement is taken up by the bellows of the compensator;

and of welding the respective second bracket end sections to the second sleeves whereby the force locked interconnection of the pipe sections is produced.

BRIEF DESCRIPTION OF THE DRAWINGS

The invention will be better understood and objects other then those set forth above, will be become apparent when consideration is given to the following detailed description thereof. Such description makes reference to the annexed drawings, wherein:

FIG. 5 a top view of the self-releasing stroke blocking means of FIG. 4 shown in its blocking position;

FIG. 6 a view similar to the view of FIG. 5 of the stroke blocking means in its ineffective position; and FIG. 7 a section through a compensator for an application at thermically or mechanically pre-stretched pipe sections.

DESCRIPTION OF THE PREFERRED EMBODIMENTS

Figure 1:
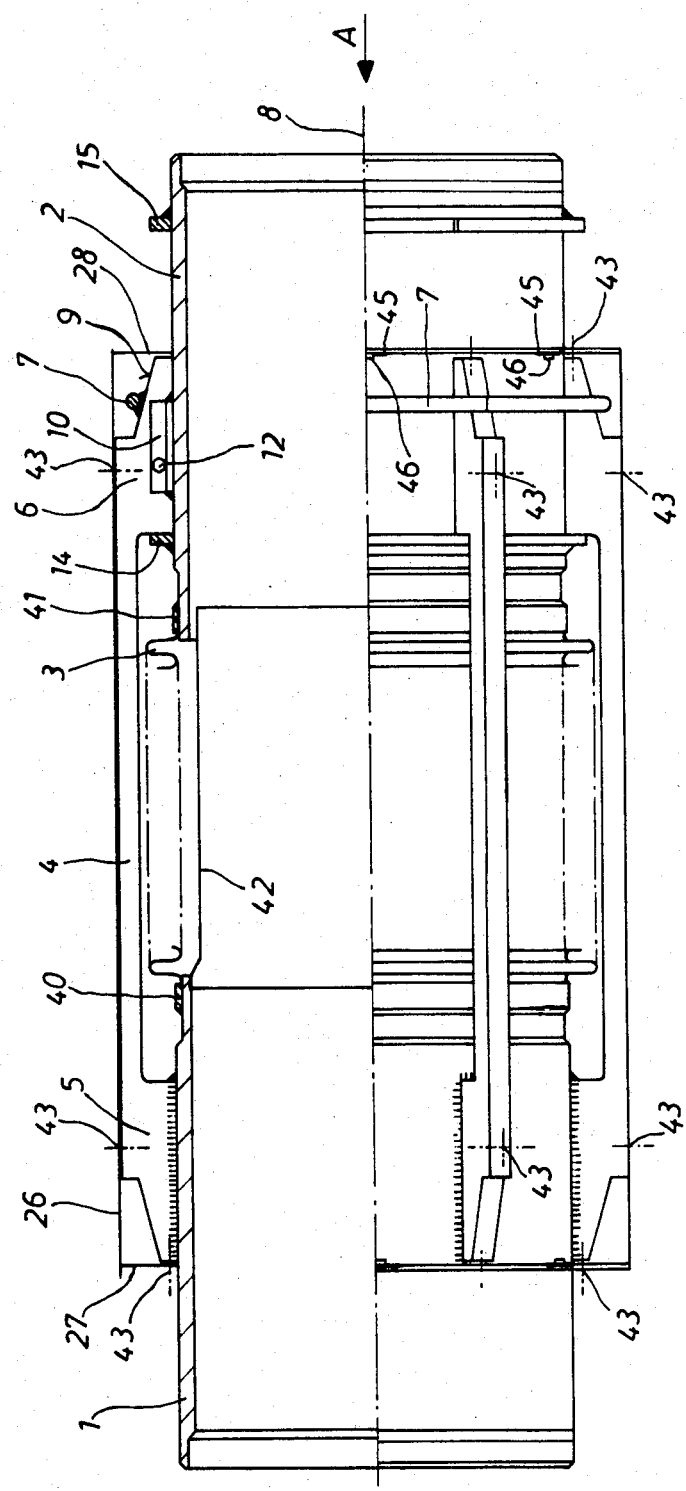
FIG. 1 is a side view of a first embodiment of a compensator constructed according to the present invention, designed partly in section.

Describing now the drawings, and considering initially the exemplary embodiment of the compensator illustrated in FIG. 1, it will be understood that the same comprises a first sleeve 1 and a second sleeve 2 located axially oppositely of sleeve 1. These two sleeves 1, 2 are designed such, that they may be mounted at their respective outer ends to a pipe conduit. Such mounting is usually carried by means of a welding. The respective inner ends of the two sleeves 1, 2 are interconnected by means of a bellows 3. This bellows 3 takes up changes of the longitudinal extent of the pipe conduits in that it can be stretched and compressed, respectively, in its axial direction. The bellows 3 is mounted to the sleeves 1, 2 in a leak-proof manner with regard to the medium flowing through the pipe conduit. To this end the bellows 3 is inserted at both its axial ends under a covering ring 40, 41 and welded at this location together with the respective covering ring 40, 41 to the respective sleeve 1, 2. A protective sleeve 42 is mounted to the first sleeve 1. This protective sleeve 42 projects within the bellows 3 and extends coaxially thereto. This protective sleeve 42 protects the bellows 3 specifically against eroding effects of the flowing medium as well as against any kind of foreign matter deposits.

A plurality of brackets 4 are welded at a first end section 5 thereof to the first sleeve 1. Each bracket 4 bridges the bellows 3 axially and rests slidingly displaceable at the opposite second end section 6 on the second sleeve 2. The embodiment of the compensator illustrated in FIG. 3 includes for example six of such brackets 4. The end section 6 of each bracket 4 is provided with an inclined surface section 9 extending inclined relative to the longitudinal center axis 8 of the compensator. A clamping ring 7 is clampingly mounted onto this inclined surface section 9 of the second end section 6 of the brackets 4. This clamping ring 7 is an integral ring closed in itself which in accordance with the number of brackets 4 of the illustrated compensator describes a hexagon. When being mounted this clamping ring 7 is placed initially loosely onto the inclined surface sections 9 and pressed or urged, thereafter against these surface sections 9 until it is tightly seated onto the second end sections 6 of the brackets 4 in a stressed condition. Such mounting and clamping of this clamping ring 7 can be carried out for instance also by blows of a hammer. The clamping ring 7 extending around the second end sections 6 biasses and urges obviously the brackets 4 against the second sleeve 2 so that they rest thereagainst in a slidingly displaceable fashion. Thereby every bracket 4 is subjected to roughly the same pressure force. After having clamped the clamping ring 7 against the inclined surfaces 9 as set forth above it is welded to for instance three of the brackets 4 such that it is rigidly and unmoveably connected thereto. Accordingly, each bracket 4 necessitates one welding spot only, namely at its first end section 5 which is mounted to the first sleeve 1. There is no need whatsoever for any further weldings. In comparison with the tube-like or pipe-like axial guiding means according to the prior art the production of these brackets 4 is obviously much cheaper and there is much less demand to be made regarding production tolerances.

Some embodiments of compensators having sleeves interconnected by means of a bellows 3 are provided with means safeguarding against a relative rotating of the two sleeves. To this end locking members 10 are provided. The illustrated embodiment comprises locking members 10 in shape of elongated angular pieces which abut laterally a respective bracket 4 such as can clearly be seen out of FIG. 1 and specifically FIG. 3. These blocking members 10 can be made obviously in a different shape, they may be for instance merely flat iron bars. At least two blocking members 10 are necessary; the total number thereof can be, however, freely chosen based on the prevailing conditions. For sake of clarity the embodiment which will be described hereinafter will be assumed to have only two such locking members 10. The blocking member 10 located in the position shown in FIG. 2 on top prevents the bracket 4 at mentioned location from rotating relative to the second sleeve 2 in a clockwise direction with reference to FIG. 3. The blocking member 10 located at the lower side of the embodiment shown in FIG. 3 prevents the lower bracket 4 at that location from rotating in a counterclockwise direction. The drawing illustrates that the surface areas 11 of the blocking members 10 abut laterally the second end section of the respective brackets 4 and describe a common plane extending aside of the longitudinal center axis of the compensator. These blocking members 10 are welded to the second sleeve 2 at the horzizontally extending leg of the L-profile shown in FIG. 3.

In order to safeguard the bellows 3 against an excessive expansion two circumferential rings 14, 15 are provided, each at an axial side of the bracket end sections 10, which circumferential rings 14, 15 are welded to the second sleeve. These circumferential rings 14, 15 limit the extent of travel of the second sleeve 2 relative to the brackets 4 of first sleeve 1, respectively, and accordingly limit the forces acting on the bellows 3. Accordingly, an excessive stretching or excessive compressing of the bellows 3 is not possible. These circumferential rings 14, 15 form abutment stops for the second end sections 6 of the brackets 4 such as is most clearly illustrated in FIG. 1.

The circumferential ring 15 prevents the second sleeve 2 from travelling too far towards the right hand side as seen in FIG. 1 and thus prevents the second sleeve 2 from being pulled too far away from the first sleeve 1 thus overstressing the bellows and the circumferential ring 14 prevents an excessive travelling of the second sleeve 2 against the first sleeve 1, that is towards the left of FIG. 1 such that the bellows 3 is safeguarded against a destruction due to excessive forces.

Each blocking member 10 is connected to the second end section 6 of the respective bracket 4 by means of a small threaded bolt 12. This bolt 12 is a temporary arresting means of the compensator. By means of this temporary arresting, the sleeves 1, 2 are blocked relative to each other in the axial direction of the compensator and, furthermore, this temporary arresting allows a mounting of the compensator such that its bellows 3 is in a predetermined prestressed condition such that in operation no excessive stressing thereof in either axial directions will arise. These threaded bolts 12 are now dimensioned such that they will be sheared off during the first axial relative movement (thermal expansion of the pipe conduit) between bracket 4 and second sleeve 2 appearing in operation. Accordingly, this compensator does not call for any kind of work relative to a disengagement of a temporary axial fastening means after it has been mounted.

Figure 2:
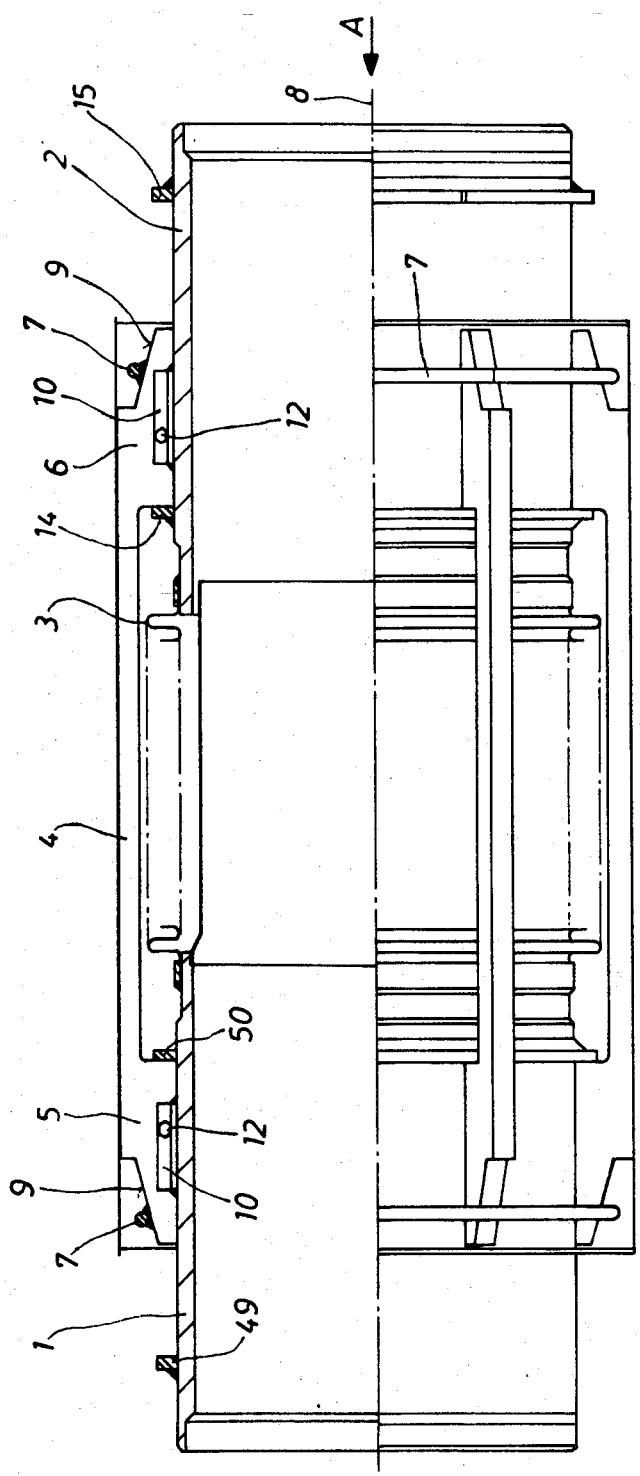
FIG. 2 is a side view of a second embodiment of a compensator constructed according to the present invention, designed partly in section.

Contrary to the embodiment of the compensator illustrated in FIG. 1 having brackets 4 which are welded at the first end section 5 to the first sleeve 1 and resting slidingly displaceable at the second end section 6 on the sleeve 2, the brackets 4 of the embodiment illustrated in FIG. 2 rest at both their ends in a slidable displaceable manner on the sleeves 1, 2.

This FIG. 2 corresponds to a large extent to FIG. 1 with the exception that some reference numerals have been deleted for the sake of clarity.

The structure of the right hand end of the compensator of FIG. 2, that is the area around the second sleeve 2 is identical to the structure of the right hand end of the embodiment illustrated in FIG. 1. Specifically to be mentioned are the end sections 6 of the brackets 4 incorporating the inclined surface areas 9 which are encased by the clamping ring 7. Furthermore, one blocking member 10 including its shearable threaded bolt 12 is illustrated. Furthermore, the figure shows the stroke limiting circumferential rings 14, 15.

The design of the left hand end of this compensator is a mirror image of the right hand end thereof. Here the first end sections 5 of the brackets 4 rest also slidingly displaceable on the first sleeve 1. A clamping ring 7 surrounds also the first end sections 5 at their inclined surface sections 9 which clamping ring 7 is welded to at least some brackets. Furthermore, the first sleeve is also provided with blocking members 10 including their shearable threaded bolts 12.

Because the first end sections 5 of the brackets 4 rest slidingly displaceable on the first sleeve circumferential rings 49 and 50 limiting the extent of axial displacement are mounted on the first sleeve 1.

Figure 3:
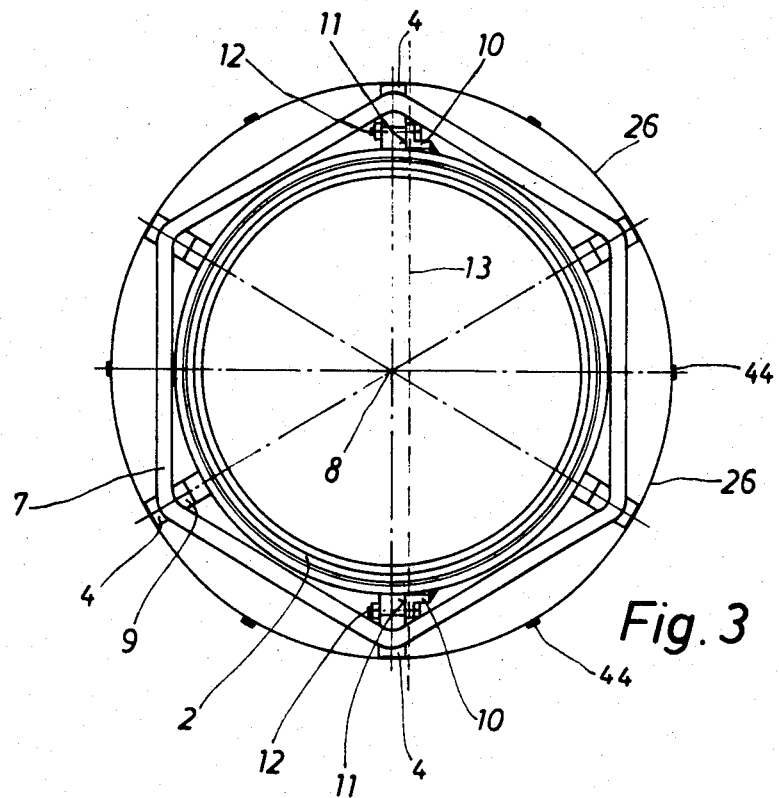
FIG. 3 is a view of the compensator illustrated in FIG. 1 or in FIG. 2 in direction of the arrow A.

The illustrated compensators are provided with a casing consisting of an assembly of several metal sheets. Such a casing is used for instance if pipe conduits are layed in a trench or if a special protection of the compensator is necessary due to other reasons. To this end a number (at least two) of shell-shaped metal sheets 26 is provided which metal sheets extend around the circumference of the compensator. The front face 27 and the rear face 28 of the casing consists of further metal sheets in the shape of sections of a circular ring. All these metal sheets 26, 27, 28 are mounted by screw bolts to the brackets 4; only to the brackets 4 and the respective locations of the screwed joints are illustrated in FIG. 1 by means of the reference numeral 43. The metal sheets forming the entire casing are divided such that one sheet each is rigidly mounted to one bracket 4 each. The longitudinal edges of the circumferential sheets 26 overlap such as illustrated in FIG. 3 by means of the reference numeral 44 and the sheets located at the face ends and illustrated in FIG. 1 by the reference numeral 27 and 28 are provided with flaps 46 extending through slots 45 located in the sheets 26 which flaps are folded down. Accordingly, the casing 26, 27, 28 of the compensator is exclusively mounted to the brackets 4 only and is supported by the brackets 4 such that no thermal stresses can build up in the casing.

Figure 4:
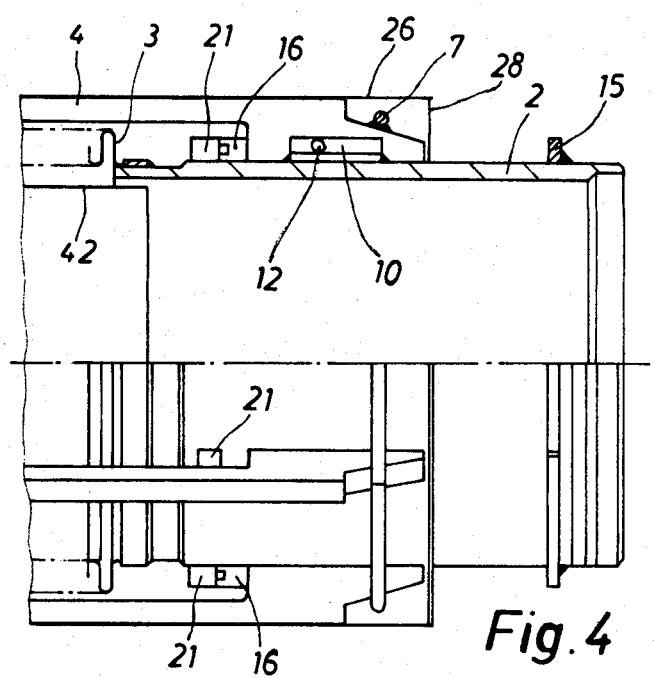
FIG. 4 is a view of the right hand end part of the compensator illustrated in FIG. 1 or in FIG. 2 which compensator is provided additionally with a self-releasing stroke blocking means.

It often is necessary to subject pipe conduits to a pressure test. Such test calls now for a special protection of the bellows 3 against an excessive elongation thereof. Attention is now drawn specifically to FIG. 4 wherein the right hand section of the compensator of FIGS. 1 or 2 is provided with an additional self-releasing stroke limiting means 16. FIG. 4 illustrates the second sleeve 2, the bellows 3 and the brackets 4. Also illustrated are a blocking member 10 with its shearable threaded bolt 12 and the clamping ring 7; and the metal sheets 26, 28 of the casing and a circumferencial ring 15 on the second sleeve 2. The design of the shearable bolt 12 is such that it is not strong enough to withstand the axial forces which are generated during pressure tests. Furthermore, the second sleeve 2 should not travel too much towards the right (based on the figures) relative to the bracket 4 in order on one hand to prevent an overstressing of individual bellows of a pipe conduit and on the other hand to also avoid a too large axial expansion within the complete pipe conduit. Conversely, however, it is desired that the compensators, that is specifically their bellows 3 can expand in a later normal operation to a larger extent in the axial direction as desired specifically due to safety reasons during the pressure tests. This object is solved now by a self-releasing stroke limiter 16 which is indicated in a simplified manner in FIG. 4 and illustrated in detail in FIGS. 5 and 6. This stroke limiter 16 comprises generally a carrier member 17 and a blocking arm 18. These two parts are hinged to each other via a pivot pin 23. The carrier member 17 consists basically of a hinge wing 22 defining a plate-like member which is fixedly mounted to a stroke limiter 21 (that is a member corresponding in function to the ring 14 of FIG. 1 which is welded to the second sleeve 2 and forms an abutment block) for instance by means of screw bolts. The blocking arm 18 consists of a hinge wing 24 and an abutment block 25 rigidly connected to the hinge wing 24 by means for instance of further screw bolts. A plate-shaped blocking member, a pivot blocking part 19 is mounted to the abutment block 25 and projects therefrom in axial direction. The carrier member 17 is mounted via a spring 20 to the blocking arm 18. In the shown embodiment this spring is a wire spring having two rectilinearly extending wire sections 47, 48. Section 47 of the spring is mounted to the carrier member 17 and section 48 of the spring is mounted to the blocking arm 18. The section of spring 20 which exerts the spring force proper extends spirally around the pivot pin 23 such as illustrated roughly in FIGS. 5 and 6. This spring is designed such that in its rest position it describes a L-shaped structure such as illustrated in FIG. 6 so when the spring is in the position as illustrated in FIG. 5 the two spring sections 47, 48 are aligned with each other to shown the spring is in its pretensioned state. Accordingly, the spring strives to pivot the pivotable blocking arm from the position shown in FIG. 5 into the position shown in FIG. 6.

The operation of this self-releasing stroke limiter 16 is as follows. The compensator is mounted such as shown in FIGS. 1 and 2. Due to the restoring force of the bellows 3 the second end section 6 of the bracket 4, see specifically FIG. 4, is pressed against the abutment block 25 and, furthermore, bracket 4 is locked relative to the second sleeve 2 by means of the shearable threaded bolt 12 (see FIG. 4). Accordingly, the second end section 6 of the bracket 4 is in the position illustrated in FIG. 5. Because the blocking member 19, the pivot blocking member which is located on the abutment block 25, abuts a side surface of the second end section 6, spring 20 remains in the prestressed condition and the stroke limiter is in the position as illustrated. If now the pressure test of the pipe conduit is made the second sleeve 2 strives to move towards the right at a simultaneous expanding of bellows 3. This is, however, not possible because the abutment block 25 abuts the second end section 6. Due to spring 20 the stroke limiter remains, therefore, in the illustrated blocking position. If now in operation a medium flows through the pipe conduit and will not only exert a pressure but may also have an increased temperature, the compensator begins with its axial length compensating movement in axial direction. Specifically now, the second sleeve 2 will shift relative to the bracket 4 towards the left hand side as viewed in FIG. 4. This shifting or displacement will proceed rather early during the begining of the operation. Because the stroke limiter 16 is rigidly mounted to the second sleeve 2 it will move away from the second end section 6 of bracket 4 which movement is illustrated by means of the arrow B of FIG. 6. Accordingly, the pivot blocking member 19 will initially move away from the second end section 6 in an axial direction and as soon as there is no more contact between these two parts an unlocking will take place by the spring 20 pivoting the abutment block 25 into the lateral position illustrated in FIG. 6. Accordingly, the relative displacement of bracket 4 relative to the second end section 6 can proceed over a larger span. Specifically the extent of possible displacement has increased such as illustrated in FIG. 6 by means of the broken lines illustrating the position of the second end section 6. Now a new stroke limiting means is presented by the mounting block 21 which corresponds to a respective one of the brackets 4.

Attention is now drawn to FIG. 7. Pipe conduits for hot mediums, specifically hot water heating systems, are subjected in operation to thermal expansions. It is a known technique to lay the individual pipe sections of such a pipe conduit by first individually anchoring each pipe section at locations remote from their ends for instance in that a trench in which the pipe sections are laid is partly filled at such locations and thereafter to interconnect these individual pipe sections in a pressure tight manner and to pass thereafter the hot medium through the conduit. Due to the temperature rise the pipe sections will expand and thereafter they will be interconnected in a force locked manner in this state of thermal expansion. By means of this means pre-expanding of the pipes it is possible to reduce the stresses generated during normal operation.

In order to carry this known method out it is necessary to insert between the individual pipe sections an expandable, however pressure proof connecting member which can be mounted in a force locked condition to the respective pipe sections after the expansion thereof. In FIG. 7 a embodiment of the compensator designed for such method as illustrated.

This compensator comprises a first sleeve 1 and a second sleeve 2 which sleeves are interconnected by means of a bellows 3 in a pressure tight fashion. The fatigue strengh of the bellows of this embodiment can be obviously smaller than the fatigue strengh of the bellows of the above described embodiments. Furthermore, one of brackets 4 including the first end section 5 and the second end section 6 surrounded by the clamping ring 7 are illustrated in FIG. 7. The second sleeve 2 is provided with the blocking member 10 including the shearable threaded bolt as well as with the circumferential ring 14. It must be noted that only the circumferential ring 14 is provided which prevents a excessively large expansion of the bellows of the compensator. An overly large compression of the compensator is prevented by a flush abutting of the respective inner face surfaces 58, 59 of the sleeves 1, 2.

In the rest position, that is for instance during shipment or readying for welding the circumferential ring 14 abuts the respective inner face surfaces 60 of the second end sections 6 of the brackets 4 located displaceably on the second sleeve 2 (this position is not illustrated). In this condition the compensator is welded in a pressure tight manner to the two pipe sections located on either side thereof. In contrast to other products known in the art it is conclusively not necessary to consider the temperature of the conduit during mounting of the compensator. Accordingly, it is not necessary to prestress the compensator to a predetermined mounting length dependent upon the temperature of the pipe conduit. The brackets 4 are rigidly connected to the first sleeve 1 and rest slidingly displaceable on the second sleeve 2. If now the hot medium is passed through the pipe conduit the pipe sections will expand thermally. Accordingly, the sleeves 1 and 2 approach each other in axial direction and the bracket 4 will slide at its second end section 6 on the sleeve 2. When viewing the illustrated figure the second sleeve 2 will move to the right under the assumption, that the first sleeve 1 including the brackets 4 is not moving. If now the pipe sections have reached the predetermined end temperature such that the axial expanding movements will come to rest, the second end section 6 of the bracket 4 will be welded to the second sleeve 2 by means of weldings identified by the reference numeral 57 such that finally the forced locked connection is made. Thereafter, the thermal insulation (such as casing sheets 26, 27 and 28 in FIG. 1) can be applied onto the joints of the pipe conduit and a possible trench filled back in. Accordingly, because the pipe sections have been welded together in a prestressed condition the stress values appearing during normal operation thereof can be kept lower.

While there are shown and described present preferred embodiments of the invention, it is to be distinctly understood that the invention is not limited thereto, but may be otherwise variously embodied and practiced within the scope of the following claims.

We claim:

1. A compensator for the compensation of axial movements of pipe conduits and including a first sleeve, a second sleeve and a bellows, the first sleeve to be mounted to a section of a pipe conduit, the second sleeve to be mounted to an another section of said pipe conduit and the bellows interconnecting said first and said second sleeves, and including a guiding means for a mutual axial guiding of said first and said second sleeves which guiding means rests slidingly displaceable on at least one of said sleeves; said guiding means comprising a plurality of brackets bridging said bellows axially and having a first end section and a second end section where the second end section is axially located opposite of said first end section, at least one of said end sections of each bracket resting slidingly displaceable on a respective sleeve, said end sections of said brackets located at a mutual distance around the circumference of the respective sleeve, and comprising at least one clamping ring extending around the bracket end sections resting slidingly displaceable on a respective sleeve, said clamping ring biassing said respective bracket end sections against the respective sleeve into a sliding engagement and being fixedly mounted to at least several of said brackets.

2. The compensator of claim 1, in which each bracket end section resting slidingly displaceable on a respective sleeve comprises at its side facing away from the sleeve an inclined surface section extending inclined relative to the longitudinal center axis of the compensator, and in which the respective clamping ring is an integral ring closed in itself and is clamped over and against said inclined surfaces.

3. The compensator of claim 2, comprising blocking members operative as safeguard against the two sleeves rotating relative to each other and located on such sleeve on which bracket end sections rest against in a slidingly displaceable fashion, each such sleeve carrying at least two blocking members mounted thereupon and resting with one surface section against a side wall section of a respective bracket end section, whereby each sleeve carries at least one blocking member preventing a clock-wise rotating of the first sleeve relative to the second sleeve and at least one further blocking member preventing a counter clock-wise rotating of the first sleeve relative to the second sleeve.

4. The compensator of claim 3, comprising a temporary mounting aid in form of a shearable threaded bolt temporarily mounting a respective bracket end section to a respective blocking member.

5. The compensator of claim 1, in which each sleeve on which bracket end sections rest against in a slidingly displaceable fashion is provided with a circumferential ring located axially on either side of said bracket end sections, and operative to limit the extent of axial displacement of said slidingly displaceable bracket end sections relative to the sleeve and thus to limit the stroke of the compensator.

6. The compensator of claim 1 having a guiding means for the mutual axial guiding of the sleeves which at the one end is rigidly mounted to the first sleeve and rests at the other end on the second sleeve in a slidingly displaceable fashion, in which each respective first bracket end section is rigidly mounted to the first sleeve and rests at the other end on the second sleeve in a slidingly displaceable fashion, and in which there is provided one clamping ring extending circumferentially around the second bracket end sections located at a mutual distance circumferentially around the second sleeve, which said clamping ring biasses said second bracket end sections against the second sleeve.

7. The compensator of claim 1, comprising a self-releasing stroke blocking means operative to remain locked in a first stroke limiting state during an initial hydraulic test and to switch automatically into a second stroke limiting position upon an initial expansion of the pipe conduit including the compensator, which stroke blocking means comprises a spring loaded pivotable locking member biassed toward its second stroke limiting position and which in said initial hydraulic test position is held locked in the first stroke limiting position and after said initial expansion is pivoted by a spring force into said ineffective position.

8. The compensator of claim 7, in which said stroke blocking means comprises a carrier member and a blocking arm hinged to the carrier member, which blocking arm is provided with a locking member, and comprises a spring acting between the carrier member and the blocking arm, which carrier member is located unmoveably on the sleeve allocated to the displaceable bracket end section, which blocking arm in its blocking position is located axially oppositely of a respective bracket end section thus limiting its axial travel, which spring biasses the blocking arm to pivot away from said bracket end section into the ineffective position, and which locking member of the blocking arm abuts a side surface of the respective bracket end section in the blocking position of the blocking arm such to prevent the blocking arm from pivoting into the ineffective position.

9. The compensator of claim 8, in which said carrier member comprises a first hinge wing supported by a mounting block, in which said blocking arm comprises a second hinge wing carrying an abutment block, said second hinge wing being pivotably supported by said first hinge wing via a pivot pin, and in which said locking member is a plate mounted at one side of said abutment block and projecting therefrom in longitudinal direction thereof.

10. A method of assembling a compensator comprising a rigid junction between thermically or mechanically pre-stretched pipe sections of a pipe conduit for hot media, which pipe sections are initially layed and interconnected in a pressure tight manner, thereafter thermically stretched and finally interconnected in a force locked manner in their stretched condition, comprising the steps of inserting the compensator between two respective pipe sections and of welding sleeves thereto;

of passing a hot medium through the pipe conduit such to heat and accordingly thermically stretch the pipe sections, whereby the respective pipe sections approach each other axially which axial movement is taken up by a bellows of the compensator;

and of welding a bracket end a sleeve to the second sleeves whereby a force locked interconnection of the pipe sections is produced.

* * * * *